Feb. 18, 1947.       W. P. MASON       2,415,832
RADIATION ABSORBER
Filed Dec. 31, 1942       3 Sheets-Sheet 1

INVENTOR
W. P. MASON
BY
ATTORNEY

Feb. 18, 1947. W. P. MASON 2,415,832
RADIATION ABSORBER
Filed Dec. 31, 1942 3 Sheets-Sheet 2

INVENTOR
W. P. MASON
BY
ATTORNEY

Feb. 18, 1947. W. P. MASON 2,415,832
RADIATION ABSORBER
Filed Dec. 31, 1942 3 Sheets-Sheet 3
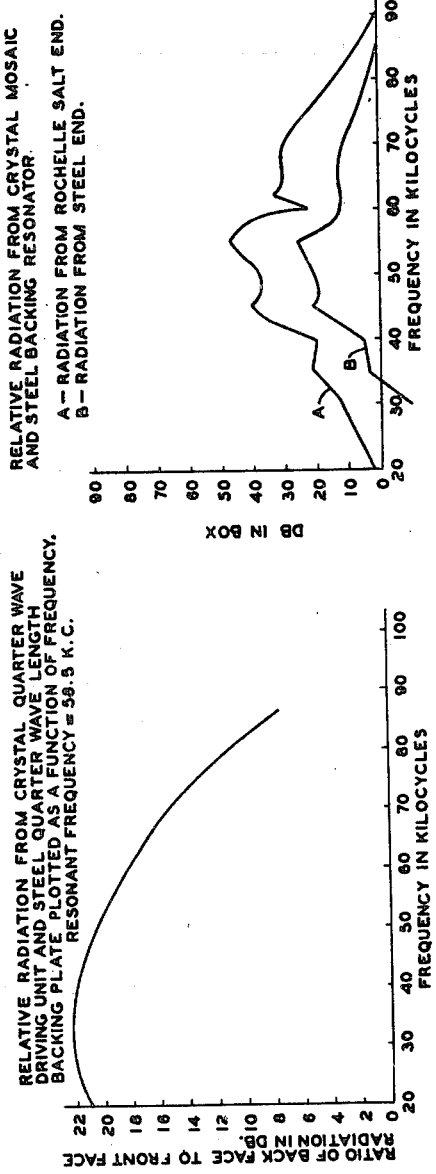
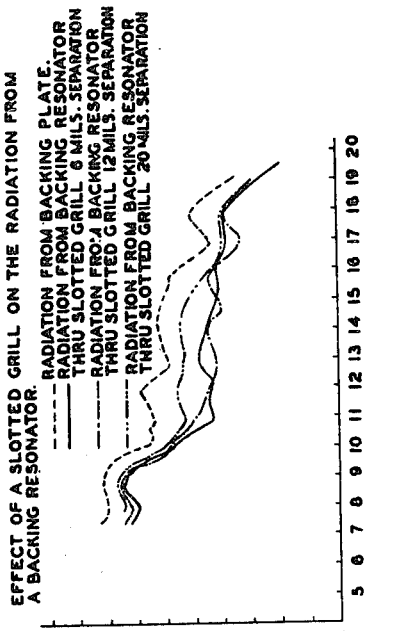
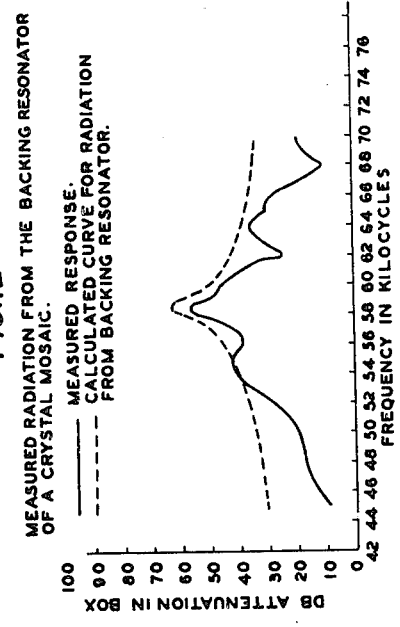
INVENTOR
W. P. MASON
BY
ATTORNEY Patented Feb. 18, 1947

2,415,832

UNITED STATES PATENT OFFICE 2,415,832

RADIATION ABSORBER

Warren P. Mason, West Orange, N. J., assignor to Bell Telephone Laboratories, Incorporated, New York, N. Y., a corporation of New York Application December 31, 1942, Serial No. 470,837

8 Claims. (Cl. 171—327)

This invention relates to sound translating devices known as electromechanical transducers and particularly to radiators and hydrophones for use in submarine signaling at ultrasonic frequencies.

The object of the invention is to produce an improvement in the directivity of such a device and particularly where the device is to be employed at such depths that its casing has to be entirely filled with a liquid medium to withstand the pressures encountered thereat. In accordance with this invention means similar to devices known as acoustic resistances are used. These may be in the form of slotted plates or screens and, being placed in the liquid medium between the end surface of the resonator and the casing, act as attenuators and reduce the amount of energy reaching the free medium, the sea water by way of example.

The use of the so-called backing resonators is disclosed and the theory of their operation is fully expounded in my copending application entitled "Compressional wave radiators and receivers," Serial No. 413,429, filed October 3, 1941.

Submarine projectors and hydrophones working large distances under the surface of the ocean are subjected to large hydrostatic pressures. For such devices it is difficult to provide air spaces inside the units, and it is desirable to have the complete inside volume filled with oil to withstand the pressures without resorting to very massive structures. In such units the crystal quarter wave-length metal backing resonators are surrounded by oil so that the transmission of waves from the end surface of the resonators is much higher than if they were in an air chamber. Under ideal conditions of resonance, perfect elasticity of the resonator and other factors the amount of energy which might thus be transmitted would approach zero, but under practical conditions this becomes a factor of importance. For various reasons, including that of efficiency it is desired to reduce the amount of energy reaching the casing of the projector or hydrophone.

The amount of energy radiated from metal backing resonators has been investigated both theoretically and experimentally and means for absorbing this energy so that the amount reaching the casing is small, have been devised and are disclosed herein.

The results of this theoretical and experimental investigation show that for a steel quarter wave backing plate, when the backing plate and the crystal are both surrounded by an absorbing medium, the steel backing plate will radiate about one per cent as much energy as the crystal unit. For a lead backing plate, however, about nine per cent as much energy will be radiated from the lead backing as from the crystal surface.

The analysis also shows that if the metal backing plate alone is placed in the liquid and the crystals vibrate in air, a very sharp resonance curve is obtained similar to the characteristics of a magnetostriction projector. This type of characteristic is of use by way of example where more than one projector is required in a given region. By changing the metal backing plate composition, the breadth of the resonance curve can be controlled.

When a lead or other low impedance backing plate is used in oil, it may be desirable to reduce the amount of sound that it can pick up. This can be accomplished by using a spaced grating or a screen which employs the viscosity of castor oil to introduce series and shunt resistances which will form an acoustic pad capable of attenuating sound from or to the metal backing plate.

A feature of the present invention is an acoustic resistance interposed between a crystal backing resonator and a casing wall in a device wherein the said casing is filled with a viscous liquid medium.

Other features will appear hereinafter.

The drawings consist of three sheets having thirteen figures, as follows:

Fig. 10 is a graph showing the relative radiation from a crystal quarter wave driving unit Fig. 11 is a set of graphs showing the relative radiation from a crystal mosaic and a steel backing resonator plotted as a function of frequency;

Fig. 12 is a set of graphs showing correspondence between theoretical calculation and experimental determination of the radiation from the backing resonator of a crystal mosaic; and Fig. 13 is a set of graphs showing the effect of a slotted grill on the radiation from a backing resonator, as determined experimentally.

*Theoretical calculation of the radiation from a backing resonator*

Figure 1:
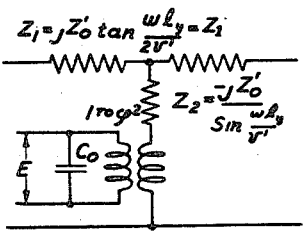
Fig. 1 is an electrical circuit diagram showing the relationship between the impedances and other equivalent factors of a vibrating crystal.

The relative radiation from the crystal front face as compared to the metal backing plate is easily calculated by employing the crystal equivalent circuit shown in Fig. 1. This is in accordance with explanations heretofore published in an article entitled "Measurement of the elastic, electric and piezoelectric constants of Rochelle salt," Physical Review, April 15, 1939. In this representation $C_0$=the static capacity of the crystal, $\phi$ the transformation factor, $Z_0'$ the mechanical image impedance of the crystal, and $v'$ the velocity of propagation in the crystal. In centimeter-gram-second units for a 45° Y-cut crystal $$C_0 = .796 \frac{l_w l_y}{l_t}; \quad \phi = 8.92 \times 10^4 l_w; \quad Z_0' = 4.19 \times 10^5 l_w l_t;$$
$$v' = 2.35 \times 10^5 \text{ centimeter per second} \quad (1)$$

where $l_y$ is the length, $l_w$ the width and $l_t$ the thickness of the crystal.

Figure 2:
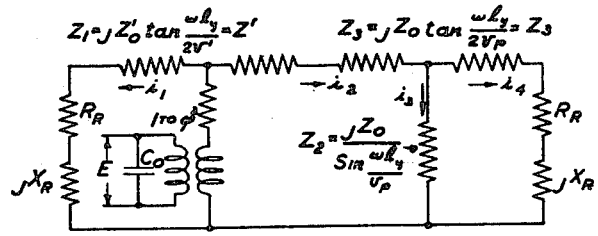
Fig. 2 is a similar circuit diagram showing the effect of a backing plate.

To represent the backing plate we add the T network of a mechanical transmission line as shown in Fig. 2 where $Z_0$ the mechanical image impedance and $v$ the velocity are given by $$Z_0 = l_w l_t \sqrt{\rho Y_0}; \quad v = \sqrt{\frac{Y_0}{\rho}} \quad (2)$$

where $\rho$ is the density and $Y_0$ the value of Young's modulus. For steel and for lead the values are given in Equation 3:

Steel $\rho = 7.8$; $Y_0 = 2 \times 10^{12}$; $Z_0 = 3.95 \times 10^6 l_w l_t$; $v = 5.06 \times 10^5$ Lead $\rho = 11.3$; $Y_0 = 1.57 \times 10^{11}$; $Z_0 = 1.33 \times 10^6 l_w l_t$; $v = 1.18 \times 10^5$ (3)

In addition we terminate both sides of the equivalence in radiation resistances $R_R$ and radiation reactances $X_R$ representing the reaction of the medium on the radiating surfaces. These are taken equal since we are assuming equal areas for the crystal and backing plate and equal absorbing media on the two sides. When both the crystal and the backing plate have large areas, $X_R$ becomes small and the radiation resistance $R_R$ equals $$R_R = 1.5 \times 10^5 \, l_w l_t \quad (4)$$

The relative radiation from the two faces can be determined by solving for the ratio of $i_1$ to $i_4$ for the network and squaring, since both ends are radiating into equal radiation resistances. This results in the equation $$\left(\frac{i_1}{i_4}\right)^2 = \left[\frac{(R_R + jX_R)(Z_1 + Z_3 + Z_4) + (Z_1 + Z_3)(Z_3 + Z_4) + Z_3 Z_4}{Z_4(Z_1 + R_R + jX_R)}\right]^2 \quad (5)$$

When the radiating area is large so that $X_R$ can be neglected and the crystal and backing plate are each a quarter wave-length, this formula reduces to the simple form $$\left(\frac{i_1}{i_4}\right)^2 = \frac{Z_0^4 + Z_0'^2 R_R^2}{Z_0'^2(Z_0^2 + R_R^2)} \quad (6)$$

For steel this ratio is 78.5 to 1 so that 1.26 per cent of the total energy is radiated by the steel backing plate. For lead the ratio is 9.85 so that 9.21 per cent of the total energy is radiated by a lead backing plate. The output from the steel is down 19.0 decibels while the lead is down only 10.1 decibels.

Fig. 10 shows a calculation of Equation 5 over a wide frequency range for a steel backing plate of large area. The relative responses show a greater difference for low frequencies but a smaller difference for frequencies above the quarter wave point. When the back resonator is a half wave-length as much energy is radiated from the backing plate as from the crystal surface. For a frequency range of 1.6, centered around the quarter wave point, the amount radiated from the steel backing resonator will be at least 15 decibels down from that radiated from the crystal surface.

*Experimental determination of relative radiation from crystal and metal backing plates*

Figure 3:
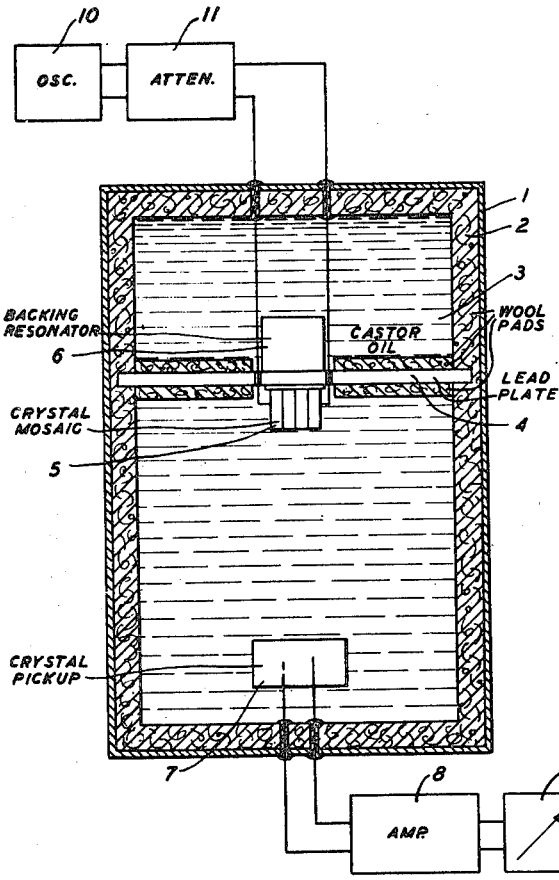
Fig. 3 is a diagram, partly a schematic circuit diagram and partly a sectional mechanical arrangement showing the relationship of certain apparatus used in the experimental determination of the relative radiation from the crystal and its backing plate.

In order to check the above theoretical conclusion certain experiments have been made. The apparatus for the experimental arrangement is shown in Fig. 3. It consists of a container 1, divided into two parts and lined with a metal wool. The small passages in the wool introduce considerable losses in the vibrations in castor oil 3 and form a dissipative lining which absorbs to some extent the standing waves in the castor oil. On a supporting plate 4 of the container there is mounted a crystal mosaic 5 and its backing resonator 6, the crystal mosaic 5 being immersed in the castor oil of the lower chamber and the backing resonator 6 being immersed in the castor oil of the upper chamber. During a portion of the experiments the crystal and its backing resonator are located as shown and in another portion these elements are reversed, the crystal mosaic 5 being immersed in the castor oil of the upper chamber and the backing resonator 6 being immersed in the castor oil of the lower chamber.

The radiation in the lower chamber from the crystal or backing plate is measured by means of the longitudinally vibrating Rochelle salt crystal 7, which is connected to an amplifier 8 and meter 9. The crystal mosaic 5 is driven by an oscillator 10 working through an attenuator 11.

The experimental procedure was to vary the oscillator 10 over a wide frequency range, with the driving crystal 5 in the measuring side and record the results shown by the meter 9. The mosaic 5 was then turned around so that it was in the upper chamber and the resonator 6 in the lower chamber with its face the same distance from the measuring crystal 7 and the run repeated.

Fig. 11 shows the results of such a test for a steel backing plate. From 30 kilocycles to 70 kilocycles the difference varies from 17 decibels to 21 decibels or an average of 19 decibels which agrees well with the figure obtained theoretically. Above 70 kilocycles the relative responses of the two surfaces become more nearly equal as predicted by the curve of Fig. 10.

A similar run was made with a lead backing plate and within the experimental error the response from the lead plate was down 10 decibels over that from the crystal surface in agreement with calculations.

*Radiation from backing plate with crystal in air*

Figure 4:
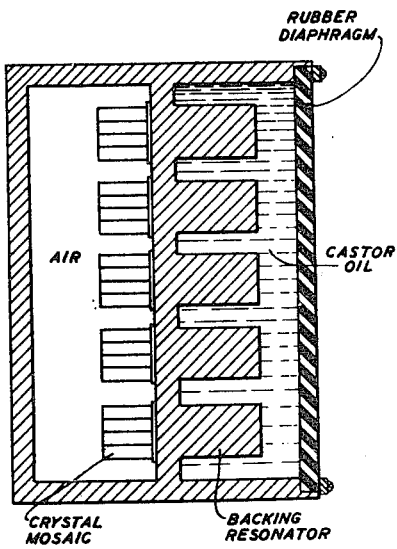
Fig. 4 is a sectional view of an arrangement to take advantage of the sharp frequency response obtainable with a projector which radiates only from the backing resonators.

Magnetostrictive radiating units used in submarine detection have a sharp resonance curve and radiate efficiently only over a narrow band of frequencies, whereas most Rochelle salt radiators have a very wide response range. It is the purpose of this section to show that a sharply tuned response can be obtained with a crystal resonator if desired by simply reversing the usual construction by putting the crystal in the air and the backing resonator in the medium. One such unit is shown in Fig. 4. This is essentially the construction of the magnetostrictive type of radiator, which accounts for the narrow frequency range obtained with such units. For some purposes, however, such characteristics are desirable and hence it appears worthwhile to consider what characteristics are obtainable with a sharply tuned Rochelle salt radiator.

The circuit of Fig. 2 is applicable to this case if we short-circuit the left-hand or crystal radiation end. If we combine all the mechanical elements, the resulting mechanical impedance becomes $$Z_M = \frac{(Z_1+Z_2)(Z_3+Z_R)Z_4 + (Z_1+Z_3)(Z_1+Z_2)(Z_3+Z_4+Z_R) + Z_1 Z_2(Z_3+Z_4+Z_R)}{Z_1(Z_3+Z_4+Z_R) + (Z_3+Z_R)Z_4 + (Z_1+Z_3)(Z_3+Z_4+Z_R)} \quad (7)$$

where $Z_R$ is the radiation impedance of the medium. A little consideration shows that the principal resonance frequency of this combination comes very close to the quarter wave-length frequency of the backing resonator and crystal. If we insert the expression for $Z_1$, $Z_2$, $Z_3$, $Z_4$ and let $$\omega = (\omega_R + \Delta\omega)$$

where $\omega_R$ is the frequency of the quarter wave-length, the impedance $Z_M$ takes the form $$Z_M = \frac{Z_0'^2 Z_0^2 Z_R + \frac{\pi \Delta\omega}{\omega_R}(Z_0 Z_0'^2 Z_R(Z_0+Z_0')) - j\left[2Z_0'^3 Z_R^2 - \frac{\pi \Delta\omega}{2\omega_R}[Z_0^3 Z_0'(Z_0+Z_0') - Z_0'^2 Z_R^2(2Z_0'+Z_0)]\right]}{\left(Z_0^2 - \frac{\pi \Delta\omega}{\omega_R} Z_0 Z_0'\right)^2 + \left(2Z_0' Z_R + \frac{\pi}{2}\frac{\Delta\omega}{\omega_R} Z_R(2Z_0'+Z_0)\right)^2} \quad (8)$$

Hence the mechanical resonant frequency of the combination occurs slightly above the quarter wave frequency, by an amount $$\frac{\Delta\omega}{\omega_R} = \frac{4}{\pi}\left[\frac{Z_0'^2 Z_R^2}{Z_0^3(Z_0+Z_0') - Z_0' Z_R^2(2Z_0'+Z_0)}\right] \doteq$$
$$\frac{4}{\pi}\frac{Z_0'^2 Z_R^2}{Z_0^3(Z_0+Z_0')} \quad (9)$$

At the mechanical resonant frequency the radiation resistance is given closely by the expression $$R_B = \frac{Z_0'^2}{Z_0^2} R_R \quad (10)$$

so that this resistance has been stepped down in the ratio of the square of the crystal impedance to the bar impedance. For the small change in frequency between the quarter wave-length frequency of the bar and the mechanical resonance, the reactance term changes from $$-\frac{2jZ_0'^3 Z_R^2}{Z_0^4}$$

to zero. This corresponds to the action of a compliance $C_M$ and mass $M$ in series having the values $$C_M = \frac{4}{\pi\omega_R}\left[\frac{1}{Z_0'\left(1+\frac{Z_0'}{Z_0}\right)}\right] = \frac{8l_y}{\pi^2 l_w l_t Y_0(1-k^2)} \times$$
$$\frac{1}{1+\frac{Z_0'}{Z_0}} = \frac{M_c}{1+\frac{Z_0'}{Z_0}} \quad (11)$$

$$M = \left(\frac{\rho l_w l_t l_y}{2}\right)\left(1+\frac{Z_0'}{Z_0}\right) = M_c\left(1+\frac{Z_0'}{Z_0}\right)$$

that is the values are the same as those for a quarter wave-length crystal except that the compliance is divided by $$1 + \frac{Z_0'}{Z_0}$$

while the effective mass is increased by the factor $$\left(1+\frac{Z_0'}{Z_0}\right)$$

The Q of a 45-degree Y-cut Rochelle salt crystal mosaic radiating into a medium is given by $$Q = \frac{1}{\omega_R C_M R_R} = \frac{\pi}{4}\frac{Z_0'}{R_R l_w l_t} = \frac{\pi}{4}\frac{(4.19\times 10^5)}{(1.5\times 10^5)} = 2.2 \quad (12)$$

When used alone this gives a rather wide transmission region. The maximum Q that can be obtained from a back plate resonator will be $$Q_B = \frac{1}{\omega_R C_M R_B} = \frac{\pi}{4}\left[\frac{Z_0(Z_0+Z_0')}{Z_0' R_R l_w l_t}\right] \quad (13)$$

For steel and lead the values will be $Q_B=215$ for steel; $Q_B=31.5$ for lead. Hence either the lead or steel backing plates will give considerably sharper frequency response than will the quarter wave-length crystal radiator.

In order to work efficiently with these types of radiators the loss due to gluing must be kept very small. A Q of 215 for the radiator in air will cause a loss of 3 decibels in radiated energy for a steel backing plate, whereas it would cause only a loss of 13 per cent energy or 0.6 decibel for a lead backing plate.

In order to test out these relationships, a well glued crystal mosaic, glued to a steel backing resonator was obtained. The ceramic plate was silver plated by chemical deposition and then copper plated to build up the layer. The ceramic was then sweated down to the steel plate. The idea of this bond rather than the usual glued bond was to eliminate some of the gluing loss since it has been found that the ceramic to steel joint is the poorest by present techniques. The crystal mosaic was then glued to the ceramic by the use of a thin layer of Bakelite glue. The crystal mosaic when measured alone had a Q of 300, while the Q of the crystal and steel resonator had a Q of nearly 200. Since the resistances of the two joints are additive in Q determination, this indicates that the resistance put in by the glued joint between the Rochelle salt and steel is only half as much as that introduced by gluing the mosaic together.

The resonant and anti-resonant frequencies of the complete resonator, the resistance at resonance, and the capacitance at a high frequency were measured with the result $$f_R = 58{,}500 \text{ cycles}; \quad f_A = 60{,}540 \text{ cycles}$$
$$R = 13{,}500 \text{ ohms}; \quad C_0 = 15\mu\mu f \quad (14)$$

This gives the following constants for the equivalent circuit $$C_0 = 15\ \mu\mu f.; \quad C_1 = 1.06\ \mu\mu f.; \quad L_1 = 6.95 \text{ henries}$$
$$R_1 = 13{,}500 \text{ ohms}; \quad Q = 190 \quad (15)$$

In agreement with the calculation of Equation 11, the value of $C_1$ is slightly lower than for a 45-degree Y-cut crystal alone. For the mosaic vibrating as a quarter wave-bar (i. e., with a perfect clamp) the ratios of capacitances in the crystal is 12, and the value of $C_1$ will be 1.18 $\mu\mu f$. From Equation 11 the effect of the imperfect clamp should be to decrease this capacitance in the ratio $$\frac{1}{1+\frac{Z_0'}{Z_0}}=\frac{1}{1+\frac{4.19\times 10^5}{39.5\times 10^5}}=\frac{1}{1.106} \quad (16)$$

Applying this factor the measured capacitance $C_1$ for this case should be 1.06 $\mu\mu f$. which is close to the value found.

The mosaic and backing plate were then put in the experimental arrangement of Fig. 3, with the oil removed from the top section. The backing resonator was immersed nearly up to the top while the crystal was placed in air. The constants of the resonator were measured again with the values $C_0=18$ $\mu\mu f$.; $C_1=1.06$ $\mu\mu f$.; $L_1=6.95$ henries; $R=25,000$ ohms; $Q=102$ \quad (17)

This shows that 3 $\mu\mu f$. distributed capacitance is added by the outside tank and 11,500 ohms radiation resistance due to immersion of the back plate in castor oil. This compares to the theoretical value given by Equation 13 of $$R=\frac{\omega L_1}{Q_B}=\frac{6.28\times 58,500\times 6.95}{215}=11,900 \text{ ohms} \quad (18)$$

The response curve measured in the experimental arrangement of Fig. 3 is shown in Fig. 12. The response is over a narrow band peaked at 58,500 cycles which is the resonant response of the composite unit. The calculated response of the unit working from the 100-ohm attenuator, compared to the response of a perfect transformer working between 100 ohms and 25,000 ohms is shown by the dotted line of Fig. 12. This is calculated from the equation:

$$\frac{i_R}{i_T}=\frac{2\times\sqrt{R_1 R_T}}{\sqrt{\left[R_1+R_T+R_1 r\left(1-\frac{\omega^2}{\omega_R^2}\right)\right]^2+\left[R_1 R_T\omega C_0-\frac{r\left(1-\frac{\omega^2}{\omega_R^2}\right)}{\omega C_0}\right]^2}} \quad (19)$$

where $R_1$ is the input impedance 100 ohms, $R_T$ the terminating resistance 25,000 ohms, $r$ the ratio of capacitances $C_0/C_1=17$; $C_0$ the static capacitance 18$\mu\mu f$., and $\omega_R=2\pi$ times the resonant frequency $f_R$. The dotted line of Fig. 12 represents this loss subtracted from the response of the oscillator connected directly to the detector. Except for variations due to reflections in the measuring system, this response agrees well with that measured near the resonance.

*Use of slotted plates and screens to cut down back radiation*

When oil surrounds both the crystal radiator and the quarter wave metal backing plate, the back radiation from the backing plate is down only 10 to 20 decibels depending on the type of backing resonator. This may not be sufficient to give the required front to back discrimination. It is the purpose of this invention to provide a simple method for cutting down the back radiation and increasing the front to back ratio.

Figure 5:
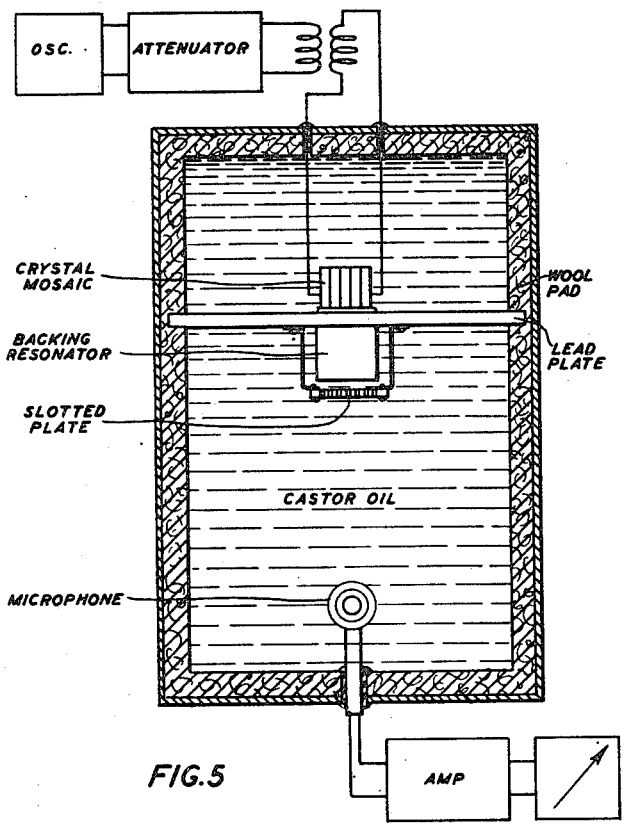
Fig. 5 is another figure similar to Fig. 3 showing the position of a slotted plate used in experimental apparatus to determine the effect of one form of an acoustic resistance.

The method depends on the fact that practically all the radiated back energy comes from the end of the backing resonator working into the radiation resistance and reactance of the medium. To cut down this radiation a slotted piece of steel is placed at a definite separation from the end of the radiating back plate as shown in Fig. 5, which shows the experimental arrangement used to check the theory. The whole unit is immersed in castor oil which has a high viscosity, i. e., a value of 6.8 at 25° C. and considerably higher at lower temperatures.

It is well known that a single slot in a viscous medium will introduce a series resistance and reactance equal to $$Z_2=\frac{l}{l_t l_w}\left[\frac{12\mu}{l_t^2}+j\frac{6}{5}\omega\rho\right] \quad (20)$$

It is shown hereinafter that if the oil is compressed between a movable piston and an immovable wall that the reaction on the piston will be that of a shunt resistance and mass having approximately the values per square centimeter $$Z_1=\frac{3}{2}\frac{\mu a^2}{l_t^3}+j\frac{3}{20}\frac{\omega\rho a^2}{l_t} \quad (21)$$

where $a$ is the radius of the circular piston, $\mu$ the coefficient of viscosity, $\rho$ the density, and $l_t$ the thickness of the liquid layer.

Figure 6:
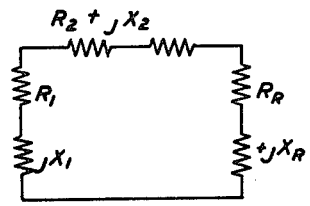
Fig. 6 is a circuit diagram illustrating the factors considered in the use of a slotted plate as in Fig. 5.

Applied to the device of Fig. 5, the equivalent circuit will be as shown in Fig. 6. The effect of the slotted plate is to put a shunt impedance $Z_1$ and a series impedance $Z_2$ between the radiating piston and the radiation impedance. By adjusting these elements a considerable reduction of energy in the free liquid can be effected.

To test out the effect of a slotted plate in back, a plate 4 centimeters by 4 centimeters and $\frac{1}{8}$ inch or 0.318 centimeter thick, was provided having 19 slots 15 mils or 0.381 centimeter thick, with an average of 5.1 slots per centimeter. At 10,000 cycles this unit will have a series impedance of $$Z_2=\left(\frac{.318}{5.1\times.0381}\right)\left[\frac{12\times 6.8}{(.0381)^2}+j\frac{6}{5}\times 2\pi\times 10,000\times 1\right]=$$
$$9.2\times 10^4+j12.4\times 10^4 \quad (22)$$

acoustic ohms per square centimeter. The radiation resistance of this unit, taking it as being equivalent to a circular piston of the same area, for a frequency of 10,000 cycles will be $$Z_R=4.2\times 10^4+j\,8.24\times 10^4 \quad (23)$$

acoustic ohms per square centimeter. Taking a 20 mil separation, the shunt impedance $Z_1$ will have a value of $$Z_1=2.72\times 10^5+j\,6.5\times 10^5 \quad (24)$$

mechanical ohms per square centimeter.

With these values the output velocity is cut down in the ratio .742 which represents a loss of 2.6 decibels. Also the energy delivered to the output will be divided between the series resistance $R_2$ and the radiation resistance $R_R$ which represents a further loss of 5 decibels in the energy in the free liquid. Actually experiments show that the loss is larger than this which may be due to a cancellation of the energy radiated from the sides of the slotted plate compared to that radiated from the face.

This reduction has been tested experimentally by employing the arrangement shown in Fig. 5. The backing plate was placed in the lower chamber and the crystal mosaic in the upper chamber and both surrounded by oil. Previous experiments had shown that there was no appreciable transmission from the upper chamber to the lower. A 600 to 80,000-ohm transformer was inserted between the attenuator and the crystal, giving a higher input into the unit. The difference in reading between the oscillator connected directly to the amplifier, and the reading of the microphone, for back radiation from the backing resonator is shown by the dotted line of Fig. 13. The slotted plate was then placed at a definite separation from the backing resonator and the run repeated. For a six-mil separation, the difference curve is shown by the full line. This is from 10 to 20 decibels below the radiation from the backing resonator alone, indicating a 15-decibel advantage in back radiation due to the slotted plate. The curve was repeated with 12-mil and 20-mil separations. The result of the 12-mil separation is shown by the dot-dash line. Although some points are lower, other points are higher so that the average attenuation is about the same as for the six-mil separation. The 20-mil separation, as shown by the dash, two dot curve, gave a definitely lower attenuation indicating that radiation was beginning to come from the slit width.

Figure 7:
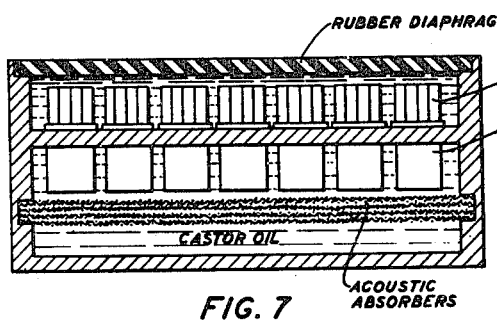
Fig. 7 is a sectional mechanical view of a complete radiator, showing the use of screens as acoustic absorbers.
Figure 8:
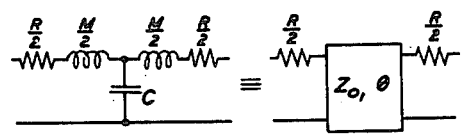
Fig. 8 is a diagram showing how the impedance of an oil layer and the resistance of two screens may be shown by an equivalent circuit, the diagrammatic circuit at each side being for all practical purposes equivalent to each other.

Another use for a combination of this sort is to act as an attenuator in a complete radiator, as shown in Fig. 7. Here the backing resonators are completely surrounded by oil and back of these are a series of slotted plates or screens. The screens act as a series inductance and a resistance provided that they have enough mass (actual plug mass of liquid that they drag along) to remain stationary. It has been found that most screens have enough effective mass to make them act as series resistances and masses down to a frequency of 10,000 cycles or less. When the lateral dimension is very wide and the spacing between screens is narrow, Equation 42 shows that the shunt impedance between screens reduces to $$Z_1 = \frac{-j\rho v^2}{l_t \omega} \quad (25)$$

which indicates that any sidewise motion of the liquid is damped out as might be expected. The series inductance and shunt compliance make up a line of characteristic impedance $$Z_0 = \sqrt{\frac{M}{C}} = \sqrt{\left(\frac{6}{5}\frac{l\rho}{A} + l_t\rho\right)\frac{\rho v^2}{l_t}} = \rho v \sqrt{H\frac{6}{5}\frac{l}{Al_t}} \quad (26)$$

where $l$ is the thickness of the screen, $l_t$ that of the gap between screens and $A$ the effective portion of a screen one centimeter square that is open. It is desirable to keep this impedance low so that the characteristic impedance of the screen system will not differ greatly from the impedance of the liquid. This will best be satisfied by a screen type structure in which the effective area $A$ is made .5 or larger and the separations between screens in the order of .1 to .2 inch, resulting in an impedance nearly the same as the liquid. For example, for a 100 mesh to the inch screen made from four-mil wires and separated from the next screen by 0.1 inch, the impedance will be $$Z_0 = \rho v \sqrt{1 + \frac{6}{5} \times \left(\frac{.004}{.5 \times .1}\right)} = 1.048 \, \rho v \quad (27)$$

The extra resistance R put in by the screen will add a resistance R/2 to this characteristic impedance if we have a large number of screens together. It will also cause an attenuation of $$\alpha = 20 \log_{10}\left(\frac{2Z_0 + 2R}{2Z_0 + R}\right) \quad (28)$$

for every additional screen added to the assembly.

To test out this idea six layers of screen having 100, four-mil wires to the inch were put together with a spacing of 100 mils and the attenuation of the combination measured. This gave quite uniformly over the frequency range down to 15 kilocycles an attenuation of three decibels. This indicates a value of R equal to $$.115 Z_0 = 1.73 \times 10^4 \text{ ohms per screen} \quad (29)$$

which is close to what one would calculate from Equation 20. Next, six more layers were added and the attenuation measured again. Although the standing waves in the system lined with metal wool do not allow a very exact comparison at any one frequency, the average attenuation of the twelve screens was 6 decibels. Twenty layers of screening of this type back of the back resonators of Fig. 7 would introduce a loss of around 10 decibels. This would require a thickness of 2 inches or 50 centimeters.

Another use to which a system of screens of this sort could be put is in providing a better absorbing layer around the edges of the measuring tank. The wool used in the measurements here introduce standing waves which may cause irregularities up to 5 decibels. By using a system of screens around the side and ends a considerably better absorption should be obtained.

There are two ways in which this could be accomplished. In the first method screens are added on the outside till the series resistance of the screens is equal to the value of $\rho v$ for the liquid. This requires about five layers of the screen measured above. The screen is then surrounded by a layer of material such as a thin layer of rubber which has a low acoustic impedance. The termination will then be practically the resistance of the screening which should match closely the radiation resistance of the medium.

The other method would be to pile on twenty or more layers of screening which would introduce a loss of 10 decibels and prevent the impedance beyond the screening from affecting the impedance at the screen surface. This would have an image impedance which would not differ much from that of the liquid, as shown by Equation 27. For a resistance termination not greater than (1.±.2) the radiation impedance $\rho v$, it can be shown that standing waves will not affect the measurements by more than ±1 decibel which is considerably better than has been obtained with a wool lining.

*Impedance of a liquid layer*

Figure 9:
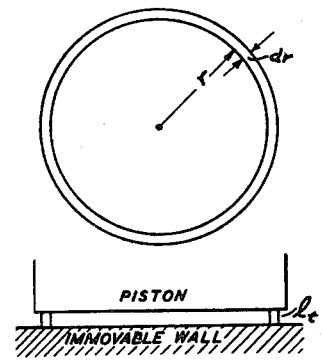
Fig. 9 is a combination end and side view illustrating the relationship of certain factors used in the formulae relating to the movement of a piston in proximity to an immovable wall.

The case of interest here is that shown in Fig. 9, where we have a piston compressing a liquid against an immovable wall. This case has been considered by Crandall (see "Theory of vibrating systems and sound," page 28, by Irving B. Crandall, published 1926 by D. Van Nostrand Company), but Crandall neglects the mass of any contained layer and considers only the resistance. For a relatively wide separation such as considered here the mass reaction may be larger than the resistance reaction and hence cannot be neglected. The present embodiment derives the impedance of such a viscous layer when account is taken of its mass.

We consider a circular ring of the liquid of radius $r$, radial thickness $dr$ and thickness $l_t$. Since the vibrations of the piston are very small compared to $l_t$, the radial reaction of the layer of liquid will be governed by the impedance of Equation 20. Applied to the circular ring this becomes $$(2\pi r l_t)dr\left[\frac{12\mu}{l_t^2}+j\frac{6}{5}\omega\rho\right]=2\pi r[p_1-p_2]=-2\pi r\frac{\partial p}{\partial r} \quad (30)$$

since $(2\pi r \dot{r} l_t)$ is the volume velocity, and $2\pi r l_t$ the cross-sectional area of the slit. This equation which relates the radial particle velocity $\dot{r}$ to the pressure reduces to $$\left(\frac{12\mu}{l_t^2}+j\frac{6}{5}\omega\rho\right)\dot{r}=-\frac{\partial p}{\partial r} \quad (31)$$

which gives one of the relations of interest.

The other is given by the equation of continuity. If we consider the elementary ring, this can be written in the form $$\frac{1}{r}\frac{\partial}{\partial r}(r\dot{r})-\frac{\dot{\xi}}{l_t}+\frac{\partial\rho}{\partial t}+0 \quad (32)$$

where $\dot{\xi}$ is the velocity of the piston, and $\rho$ the excess density. This is related to $p$ the excess pressure by the relation $$\rho=\frac{p}{p_0\gamma} \quad (33)$$

so that the equation of continuity can be written $$\frac{1}{r}\frac{\partial}{\partial r}(r\dot{r})-\frac{\dot{\xi}}{l_t}+\frac{\frac{\partial p}{\partial t}}{\rho_0 v^2}=0 \quad (34)$$

Inserting Equation 31 in 34 the equation to solve becomes $$\frac{1}{r}\frac{\partial}{\partial r}\left(r\frac{\partial p}{\partial r}\right)=-\left[\frac{12\mu}{l_t^2}+j\frac{6}{5}\omega\rho\right]\frac{\dot{\xi}}{l_t}+\left[\frac{12\mu}{l_t^2\rho v^2}+j\frac{6}{5}\frac{\omega}{v^2}\right]\frac{\partial p}{\partial t} \quad (35)$$

or for simple harmonic motion $$\frac{\partial^2 p}{\partial r^2}+\frac{1}{r}\frac{\partial p}{\partial r}-j\omega\left[\frac{12\mu}{l_t^2\rho v^2}+j\frac{6}{5}\frac{\omega\rho}{v^2}\right]p=-\frac{\dot{\xi}}{l_t}\left[\frac{12\mu}{l_t^2}+j\frac{6}{5}\omega\rho\right] \quad (36)$$

If we denote by $k^2$ $$k^2=\left[\frac{6}{5}\frac{\omega^2}{v^2}-j\frac{12\mu\omega}{\rho v^2 l_t^2}\right] \quad (37)$$

a solution of (37) is $$p=AJ_0(kr)-j\frac{\dot{\xi}\rho v^2}{l_t\omega} \quad (38)$$

It is usually assumed that $p=0$ when $r=a$ the radius of the piston since the liquid can expand at the edge. Actually we should assume a radiation resistance and mass termination at the edge put in by a radially vibrating ring representing the in and out motion of the layer of liquid. This impedance will be small and can usually be neglected if the thickness $l_t$ is small. The energy communicated to the medium through this source, however, will increase if $l_t$ increases and sets a limit to the gap that can profitably be used as a shunt element.

If we set $p=0$ when $r=a$, the constant $A$ becomes $$A=\frac{j\dot{\xi}\rho v^2}{l_t\omega}J_0(ka) \quad (39)$$

and the pressure at any point $r$ will be given by $$p=\frac{-j\dot{\xi}\rho v^2}{l_t\omega}\left[1-\frac{J_0(kr)}{J_0(ka)}\right] \quad (40)$$

To determine the impedance exerted on the vibrating piston we integrate $p$ over the surface and obtain the average value. This will be $$p_{ave}=\frac{-j\dot{\xi}\rho v^2}{Sl_t\omega}2\pi\int_0^a r\left[1-\frac{J_0(kr)}{J_0(ka)}\right]rdr=$$

$$\frac{-j\dot{\xi}\rho v^2}{l_t\omega}1-\left[\frac{2J_1(ka)}{kaJ_0(ka)}\right] \quad (41)$$

The acoustic impedance per square centimeter will then be $$Z_1=\frac{p_{ave}}{\dot{\xi}}=\frac{-j\rho v^2}{l_t\omega}\left[1-\frac{2J_1(ka)}{kaJ_0(ka)}\right] \quad (42)$$

If we expand the Bessels functions in power series, this impedance becomes $$Z_1=\frac{+j\rho v^2}{l_t\omega}\left[\frac{k^2a^2}{8}+\frac{k^4a^4}{48}+\frac{11}{3072}k^6a^6+\frac{3}{2560}k^8a^8+\cdots\right] \quad (43)$$

Inserting the value of $k^2$ from (37) and collecting terms, the resistance and reactance terms become $$Z_1=\frac{3}{2}\frac{\mu a^2}{l_t^3}\left[1+\frac{2}{5}\frac{\omega^2}{v^2}a^2+\frac{99}{800}\frac{\omega^4 a^4}{v^4}\left(1-\frac{100}{3}\frac{\mu^2}{\omega^2\rho^2 l_t^4}\right)+\cdots\right]+$$
$$j\frac{3}{20}\frac{\omega\rho a^2}{l_t}\left[1+\frac{\omega^2 a^2}{5v^2}\left(1-\frac{100\mu^2}{\omega^2\rho^2 l_t^4}\right)+\frac{33}{800}\frac{\omega^4 a^4}{v^4}\left(1-\frac{300\mu^2}{\omega^2\rho^2 l_t^4}\right)+\cdots\right] \quad (44)$$

If we set $\rho=0$, i. e. neglect the mass, the reactance becomes negative and the solution given by Crandall results. However, for the present purpose this cannot be done. If the diameter is less than a half wave-length, and the spacing $l_t$ is in the order of 20 mils, only the first two terms are of importance and these are given in Equation 2.

What is claimed is:

1. In combination, a crystal radiator attached to a metal backing resonator and an acoustic resistance spaced beyond said resonator for absorbing radiations therefrom.

2. In combination, a crystal radiator attached to a metal backing resonator, a housing for said radiator and its said backing resonator, a viscous liquid medium in said housing surrounding said radiator and its said backing resonator, and means for attenuating radiations from said resonator to reduce the amount of energy transmitted therefrom through said medium to said housing.

3. In combination, a crystal radiator attached to a backing resonator, whereby mechanical movement of said combination under electrical stimulus and under ideal conditions of resonance is confined to a piston-like movement of the free face of said crystal and under practical conditions of resonance is additionally manifested in a like piston-like movement of the opposite and free face of said resonator, an acoustic resistance contiguous to said moving face of said resonator for attenuating compressional waves set up in the intervening space thereby.

4. In combination, a crystal radiator attached to a backing resonator, whereby mechanical movement of said combination under electrical stimulus and under ideal conditions of resonance is confined to a piston-like movement of the free face of said crystal and under practical conditions of resonance is additionally manifested in a like piston-like movement of the opposite and free face of said resonator, a viscous liquid medium surrounding said combination of crystal and resonator, and an acoustic resistance contiguous to and in the path of vibrations set up in said medium by the said movement of said resonator.

5. In combination, a crystal radiator attached to a backing resonator, whereby mechanical movement of said combination under electrical stimulus and under ideal conditions of resonance is confined to a piston-like movement of the free face of said crystal and under practical conditions of resonance is additionally manifested in a like piston-like movement of the opposite and free face of said resonator, a viscous liquid medium surrounding said combination of crystal and resonator, and an acoustic resistance contiguous to and in the path of vibrations set up in said medium by the said movement of said resonator, said acoustic resistance comprising a thin sheet-like element having a plurality of spaced openings therein.

6. In combination, a crystal radiator attached to a backing resonator, whereby mechanical movement of said combination under electrical stimulus and under ideal conditions of resonance is confined to a piston-like movement of the free face of said crystal and under practical conditions of resonance is additionally manifested in a like piston-like movement of the opposite and free face of said resonator, a viscous liquid medium surrounding said combination of crystal and resonator and an acoustic resistance contiguous to and in the path of vibrations set up in said medium by the said movement of said resonator, said acoustic resistance comprising a slotted plate.

7. In combination, a crystal radiator attached to a backing resonator, whereby mechanical movement of said combination under electrical stimulus and under ideal conditions of resonance is confined to a piston-like movement of the free face of said crystal and under practical conditions of resonance is additionally manifested in a like piston-like movement of the opposite and free face of said resonator, a viscous liquid medium surrounding said combination of crystal and resonator, and an acoustic resistance contiguous to and in the path of vibrations set up in said medium by the said movement of said resonator, said acoustic resistance comprising a screen-like element.

8. In combination, a crystal radiator attached to a backing resonator, whereby mechanical movement of said combination under electrical stimulus and under ideal conditions of resonance is confined to a piston-like movement of the free face of said crystal and under practical conditions of resonance is additionally manifested in a like piston-like movement of the opposite and free face of said resonator, a viscous liquid medium surrounding said combination of crystal and resonator, and an acoustic resistance contiguous to and in the path of vibrations set up in said medium by the said movement of said resonator, said acoustic resistance comprising a plurality of layers of screen.

WARREN P. MASON.

REFERENCES CITED

The following references are of record in the file of this patent:

UNITED STATES PATENTS

| Number | Name | Date |
|---|---|---|
| 2,248,870 | Langevin | July 8, 1941 |